Patented Dec. 5, 1944

2,364,355

UNITED STATES PATENT OFFICE 2,364,355

AZO COMPOUNDS

Gordon F. Frame and Charles F. H. Allen, Rochester, N. Y., assignors to Eastman Kodak Company, Rochester, N. Y., a corporation of New Jersey No Drawing. Application March 14, 1942, Serial No. 434,780

5 Claims. (Cl. 260—192)

This invention relates to new azo compounds. More particularly it relates to the monoazo compounds having the formula:

$$R-N=N-R_1$$

wherein $R-N=N-$ stands for the residue of a member selected from the group consisting of a diazotized 2-aminochrysene, a diazotized 3-aminopyrene, a diazotized 4-aminofluoranthene and a diazotized 3-amino-acenaphthene and $R_1$ stands for a naphthalene sulfonic acid substituted with at least one member selected from the group consisting of a hydroxy group and an amino group.

An object of our invention is to provide new azo compounds. Another object is to provide a satisfactory process for the preparation of the new azo compounds of our invention. A further object is to prepare azo compounds which can be used to dye wool and silk.

The azo compounds of our invention can be prepared by diazotizing 2-aminochrysene, 3-aminopyrene, 4-aminofluoranthene, and 3-amino-acenaphthene compounds and coupling the diazonium compounds obtained with a naphthalene sulfonic acid substituted with at least one member selected from the group consisting of a hydroxy group and an amino group.

The azo compounds of our invention possess utility for the dyeing of wool and silk. Further, they also possess some utility for the dyeing of cotton. Depending upon the particular components employed, magenta, red, purple, blue, greenish-blue and brown dyeings can be obtained. In addition to being textile dyes, the azo compounds of our invention also possess some application as dyes for color photography.

For purposes of clarity, it is here noted that the 2-aminochrysene, 3-aminopyrene, 4-amino-fluoranthene and 3-aminoacenaphthene nuclei are numbered as indicated:

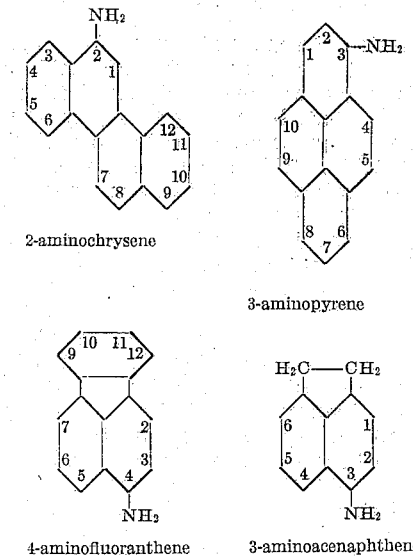

2-aminochrysene 3-aminopyrene 4-aminofluoranthene 3-aminoacenaphthene

In preparing the azo compounds of our invention, the coupling reaction is effected in an alkaline medium when a naphthol coupling component is employed and in an acid medium when a coupling component containing an amino group, but no hydroxy group, is employed.

The following examples illustrate the preparation of the azo compounds of our invention. Parts are expressed in parts by weight.

Example 1

3 parts of 2-aminochrysene are dissolved in 27 parts of concentrated sulfuric acid (Sp. G. 1.84) and the resulting solution is cooled to a temperature of about 10° C. A solution of 0.86 part of sodium nitrite in 27 parts of concentrated sulfuric acid (Sp. G. 1.84) is then added, with stirring, to the dissolved 2-aminochrysene while maintaining the reaction mixture in a cooled condition. Stirring is continued for 30 minutes after which the diazotization reaction which takes place is complete. The reaction mixture is poured upon 125 parts of crushed ice and the precipitated chrysene diazonium sulfate is collected on a filter and sucked as free as possible from the acid liquor and then dispersed in 150 parts of ice cold water.

The diazonium mixture prepared as described above is added with stirring to a solution of 4.2 parts of 1-amino-8-hydroxynaphthalene-2,4-disulfonic acid in 100 parts of water containing 3 parts of sodium carbonate at 10–15° C. After stirring for 2 hours, the coupling reaction which takes place is complete and the dye compound formed is recovered by precipitating it by the addition of sodium chloride and filtering. The dye compound obtained has the formula:

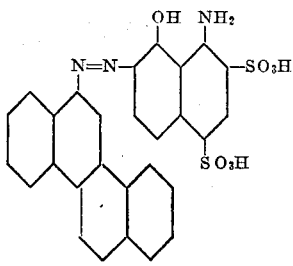

and dissolves readily in water with a blue color. It dyes wool and silk blue from an aqueous solution.

Example 2

A solution of 3 parts of 4-aminofluoranthene in 27 parts of concentrated sulfuric acid (Sp. G. 1.84) is diazotized by the addition of nitrosyl sulfuric acid made by adding 0.98 part of sodium nitrite to 22 parts of concentrated sulfuric acid (Sp. G. 1.84). The diazotization is carried out at a temperature of 5–10° C. and upon its completion, which requires about 30 minutes, the reaction mixture is poured upon 100 parts of ice and the fluoranthene diazonium sulfate which precipitates as a greenish-yellow solid is collected and pressed dry.

The diazonium compound prepared as described above is dispersed in 150 parts of ice cold water and added to a solution of 4.8 parts of 1-amino-8-hydroxy naphthalene - 2,4 - disulfonic acid in 150 parts of water containing 3.5 parts of sodium carbonate. The reaction mixture is maintained at 10–15° C. and, after stirring for about 2 hours at this temperature, the coupling reaction which takes place is complete and the dye compound formed is precipitated by adding sodium chloride and then recovered by filtering the reaction mixture. The dye compound obtained has the formula:

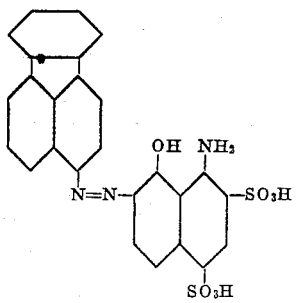

and dissolves readily in water with a blue color. It dyes wool and silk blue from its aqueous solution.

Example 3

3 parts of 3-aminoacenaphthene are dissolved in 27 parts of concentrated sulfuric acid (Sp. G. 1.84) and the resulting solution is diazotized at a temperature of 10–15° C. by adding, with stirring, a solution of 1.26 parts of sodium nitrite dissolved in 27 parts of concentrated sulfuric acid (Sp. G. 1.84). After stirring for 30 minutes, the reaction mixture is poured upon 125 parts of ice and the precipitated acenaphthene diazonium sulfate is recovered by filtration, and pressed dry.

The diazonium mixture obtained as described above is dispersed in 150 parts of ice cold water and then added to a solution of 6.1 parts of 1-amino-8-hydroxynaphthalene-3,6-disulfonic acid in 150 parts of water containing 3.5 parts of sodium carbonate. The reaction mixture is stirred for about 2 hours at 10–15° C. following which the coupling reaction which takes place is complete and the dye compound formed is precipitated by adding sodium chloride to the reaction mixture and recovered by filtering. The dye compound obtained has the formula:

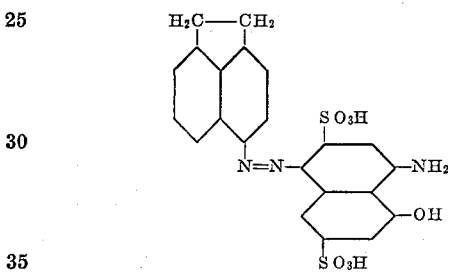

and dissolves readily in water with a magenta color. It dyes wool and silk magenta from its aqueous solution.

Example 4

1 part of 3-aminopyrene dissolved in 125 parts of water and 25 parts of hydrochloric acid (Sp. G. 1.18) is diazotized at a temperature of 5–10° C. by adding, with stirring, a solution of 0.33 part of sodium nitrite. After stirring for 10 minutes, a clear solution results and this solution is added to a solution of 1.4 parts of 1-phenylaminonaphthalene-8-sulfonic acid in 100 parts of water and 2 parts of hydrochloric acid (Sp. G. 1.18). After stirring the reaction mixture for 8 hours at room temperature, the coupling reaction which takes place is complete and the insoluble dye formed is colored by filtering the reaction mixture. The dye compound obtained is brown in color and has the formula:

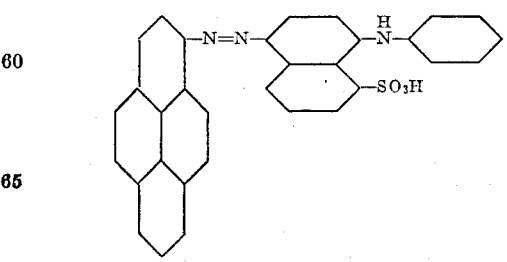

It is only very slightly soluble in water. It colors wool and silk brown from its aqueous dispersion in water.

The following tabulation further illustrates the compounds included within the scope of our invention together with the color they produce on wool and silk from their water solutions or their dispersions in water. The compounds indicated below may be prepared by diazotizing the amines listed under the heading "Amine" and coupling the diazonium compounds obtained with the compounds specified in the column entitled "Coupling component." The diazotization, coupling and recovery reactions may be carried out as indicated hereinbefore.

amino-8-bromochrysene, 2-amino-8-carboxychrysene, 3-amino-8-chloropyrene, 3-amino-10-chloropyrene, 3-amino-8-acetylaminopyrene, 3-amino-10-acetylaminopyrene, 3-amino-8-carboxylpyrene, 3-amino-10-carboxylpyrene, 3-amino-8-acetylpyrene, 3-amino-10-acetylpyrene, and the 2-aminodinitropyrenes such as are disclosed in U. S. Patent No. 2,253,555, issued August 26, 1941.

| Amine | Coupling component | Color |
| --- | --- | --- |
| 3-aminopyrene | 1-naphthol-4-sulfonic acid | Red. |
| Do | 2-naphthol-7-sulfonic acid | Purple. |
| Do | 1,8-dihydroxynaphthalene-3,6-disulfonic acid | Do. |
| Do | 2-naphthol-6-sulfonic acid | Red. |
| Do | 2-naphthol-3,6-disulfonic acid | Reddish-purple. |
| Do | 1-naphthol-3,6-disulfonic acid | Red. |
| Do | 2-amino-8-naphthol-6-sulfonic acid | Reddish-purple. |
| Do | ε-acid | Purple. |
| Do | 2-amino-8-naphthol-3,6-disulfonic acid | Red. |
| Do | 1-amino-8-naphthol-3,6-disulfonic acid | Blue. |
| Do | 2-amino-5-naphthol-7-sulfonic acid | Reddish-purple. |
| Do | 1-amino-8-naphthol-2,4-disulfonic acid | Purple. |
| Do | 1-benzoylamino-8-naphthol-3,6-disulfonic acid | Blue. |
| Do | 1-chloro-8-naphthol-3,6-disulfonic acid | Purple. |
| 4-aminofluoroanthene | 1-benzoylamino-8-naphthol-3,6-disulfonic acid | Do. |
| Do | 1-amino-8-naphthol-3,6-disulfonic acid | Do. |
| Do | 1-naphthol-4-sulfonic acid | Magenta. |
| Do | 2-amino-5-naphthol-7-sulfonic acid | Do. |
| Do | 2-amino-8-naphthol-3,6-disulfonic acid | Red. |
| Do | 2-naphthol-7-sulfonic acid | Do. |
| Do | 2-naphthylamine-1-sulfonic acid | Purple. |
| Do | 2-naphthol-3,6-disulfonic acid | Magenta. |
| Do | 1-naphthol-3,6-disulfonic acid | Red. |
| Do | 2-naphthol-6-sulfonic acid | Do. |
| Do | 1-amino-8 naphthol-4-sulfonic acid | Purple. |
| Do | 1,8-dihydroxynaphthalene-3,6-disulfonic acid | Do. |
| Do | 1-phenylaminonaphthalene-8-sulfonic acid | Green. |
| Do | ε-acid | Bright red. |
| Do | 2-amino-8-naphthol-6-sulfonic acid | Red. |
| 3-aminoacenaphthene | 1-amino-8-naphthol-2,4-disulfonic acid | Purple. |
| Do | ε-acid | Red. |
| Do | 2-amino-5-naphthol-7-sulfonic acid | Do. |
| Do | 1-benzoylamino-8-naphthol-3,6-disulfonic acid | Purple. |
| Do | 2-naphthol-3,6-disulfonic acid | Magenta. |
| Do | 2-amino-8-naphthol-3,6-disulfonic acid | Red. |
| Do | 1-naphthol-3,6-disulfonic acid | Do. |
| Do | 1-naphthol-4-sulfonic acid | Do. |
| Do | 2-naphthol-6-sulfonic acid | Do. |
| Do | 2-naphthol-7-sulfonic acid | Do. |
| Do | 2-naphthylamine-1-sulfonic acid | Do. |
| Do | 2-amino-8-naphthol-6-sulfonic acid | Do. |
| Do | 1,8-dihydroxynaphthalene-3,6-disulfonic acid | Do. |
| 2-aminochrysene | 2-naphthol-7-sulfonic acid | Purple. |
| Do | 1-naphthol-4-sulfonic acid | Red. |
| Do | 2-naphthol-6-sulfonic acid | Do. |
| Do | 2-naphthylamine-1-sulfonic acid | Do. |
| Do | 1-amino-8-naphthol-3,6-disulfonic acid | Purple. |
| Do | 2-amino-8-naphthol-6-sulfonic acid | Red. |
| Do | 1,8-dihydroxynaphthalene-3,6-disulfonic acid | Do. |
| Do | 2-amino-8-naphthol-3,6-disulfonic acid | Do. |
| Do | ε-acid | Do. |
| Do | 1-phenylaminonaphthalene-8-sulfonic acid | Green. |
| Do | 2-amino-5-naphthol-7-sulfonic acid | Red. |
| Do | 1-benzoylamino-8-naphthol-3,6-disulfonic acid | Purple. |

Additional coupling components that can be used in the preparation of the azo compounds of our invention include 1,7-dihydroxynaphthalene-3,6-disulfonic acid, 2-naphthylamine-6,8-disulfonic acid, 2-naphthylamine-3,6-disulfonic acid, 2-naphthol-8-sulfonic acid, 2-naphthylamine-6-sulfonic acid, 1-naphthylamine-5-sulfonic acid, 1-naphthylamine-7-sulfonic acid, 2-naphthol-7-sulfonic acid, 1-naphthylamine-4,7-disulfonic acid, 1-amino-8-naphthol-4,6-disulfonic acid, 1-naphthylamine-3,6,8-trisulfonic acid, 2-phenylamino-8-naphthol-6-sulfonic acid, 1,3-dihydroxynaphthalene-5,7-disulfonic acid, 1-methylaminonaphthalene-8-sulfonic acid, 2-methylamino-8-naphthol-6-sulfonic acid, 1-chloro-8-hydroxynaphthalene-3,6-disulfonic acid, 1-benzoylamino-8-hydroxynaphthalene-3,6-disulfonic acid and 2-amino-8-hydroxynaphthalene-6-sulfonic acid.

The amine compounds from which the diazonium compounds used in the preparation of the azo dye compounds of our invention are obtained may be substituted with substituents such as a nitro group, a halogen atom, an alkoxy group or a carboxyl group. Illustrative of these amine compounds are 2-amino-8-chlorochrysene, 2-

The examples given are intended to be illustrative and not limitative of our invention as any of the 2-aminochrysene, 3-aminopyrene, 4-aminofluoranthene and 3-aminoacenaphthene compounds described or indicated herein can be diazotized and the diazonium compound obtained coupled with any of the coupling compounds indicated herein to obtain dye compounds of our invention which color wool and silk the same or generally similar colors as the dye compounds specifically indicated.

No special methods are required for applying the azo compounds of our invention to wool and silk, since they can be applied to these materials by methods well known to the art. They can, for example, be directly applied to wool and silk from their solutions or dispersions in water. Many of the compounds are sufficiently water-soluble as to be directly applied from a water solution. Compounds insoluble or difficultly insoluble in water can be advantageously applied in conjunction with a solubilizing or dispersing agent such as sulfonated castor oil or sodium lignin sulfonate. Temperatures of 80–90° C. can be employed during the dyeing operation. Practically any desired concentration of dye can be employed, although concentrations from 1-5% by weight of dye to cloth are normally employed.

We claim:

1. The azo compounds having the formula:

$$R-N=N-R_1$$

wherein $R-N=N-$ stands for the residue of a diazotized 4-amino-fluoranthene and $R_1$ stands for a naphthalene sulfonic acid substituted with at least one member selected from the group consisting of a hydroxy group and an amino group.

2. The azo compounds having the formula:

$$R-N=N-R_1$$

wherein $R-N=N-$ stands for the residue of a diazotized 4-amino-fluoranthene and $R_1$ stands for a naphthalene disulfonic acid substituted with at least one member selected from the group consisting of a hydroxy group and an amino group.

3. The azo compound having the formula:

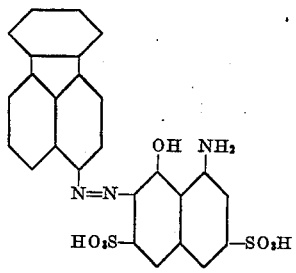

4. The azo compound having the formula:

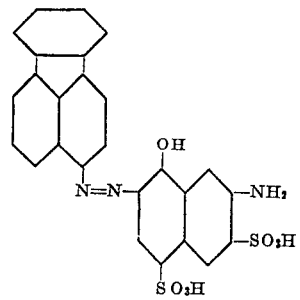

5. The azo compound having the formula:

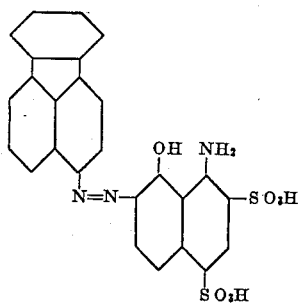

GORDON F. FRAME.
CHARLES F. H. ALLEN.